US012696375B2

(12) United States Patent
Williams

(10) Patent No.: US 12,696,375 B2
(45) Date of Patent: Jul. 28, 2026

(54) PULSED ION SOURCE

(71) Applicant: Adelphi Technology, Inc., Redwood City, CA (US)

(72) Inventor: David Lowndes Williams, Los Altos, CA (US)

(73) Assignee: Adelphi Technology, Inc., Redwood City, CA (US)

( * ) Notice: Subject to any disclaimer, the term of this patent is extended or adjusted under 35 U.S.C. 154(b) by 52 days.

(21) Appl. No.: 19/006,646

(22) Filed: Dec. 31, 2024

(65) Prior Publication Data

US 2026/0190209 A1 Jul. 2, 2026

(51) Int. Cl.
*H05H 13/00* (2006.01)
*H05H 3/06* (2006.01)

(52) U.S. Cl.
CPC ............ *H05H 13/005* (2013.01); *H05H 3/06* (2013.01); *H05H 2242/22* (2021.05); *H05H 2242/24* (2021.05)

(58) Field of Classification Search
CPC .. H05H 1/46; H05H 3/06; H05H 1/54; H05H 6/00; H05H 7/22; H05H 1/4622; H05H 2007/081; H05H 5/02; H05H 5/04; H05H 9/02; H05H 1/4652; H05H 1/2406
See application file for complete search history.

(56) References Cited

U.S. PATENT DOCUMENTS

2019/0107104 A1* 4/2019 Siddiqui .................. H05H 1/46
2020/0051826 A1* 2/2020 Glukhoy ............... H10P 50/244
2020/0357614 A1* 11/2020 Philipp ..................... H05H 7/08
2021/0368611 A1* 11/2021 Kotzian ............... H05H 1/4622

* cited by examiner

*Primary Examiner* — Wei (Victor) Y Chan
(74) *Attorney, Agent, or Firm* — Donald R. Boys; Central Coast Patent Agengy LLC

(57) ABSTRACT

A pulsing ion source having a vacuum enclosure in a cylindrical shape has an exit iris through one closed end providing ions in sequential pulses that are instantly quenched between pulses by imposition of electrical voltage on an element within the ion source.

19 Claims, 16 Drawing Sheets

PULSED ION SOURCE

BACKGROUND OF THE INVENTION

1. Field of the Invention

The present invention is in the technical field of ion sources and relates more specifically to pulsing an ion source to pulse a neutron generator.

2. Description of Related Art

It is well known that accelerating ions to a target of titanium, scandium, or zirconium is a conventional way to generate neutrons. U.S. Pat. No. 10,737,121 is an example describing and claiming a neutron generator relying on an ion plasma source providing ions and accelerating the ions over a large negative potential to a titanium target disk to produce energetic neutrons.

Neutron generators which may transition from full neutron yield to essentially zero yield very rapidly have a range of potential applications including time-of-flight measurements and activation measurements on short half-life isotopes.

A conventional way to pulse a neutron generator is to maintain a constant acceleration voltage between the neutron generator's ion source and the target and to pulse RF power to the ion source. Typically, positively charged hydrogen-isotope ions (hydrogen, deuterium, and tritium) are accelerated towards a target that is maintained at a negative potential with respect to the ion source, this acceleration voltage typically lies in the range of 50 kV to 250 kV. This approach allows the use of high efficiency Radio Frequency (RF) driven ion sources such as the Electron Cyclotron Resonance ion sources, an example of which is described in U.S. Pat. No. 11,574,788 (Williams 2023). A gas source (such as deuterium) may be introduced into the system comprising the ion source and actively evacuated using a turbo pump. Alternatively, the entire generator may be maintained at a pressure sufficient for the plasma to form in the ion chamber when RF power is applied, so gas inlet is not required into the ion source.

In RF driven ion sources such as ECR (electron cyclotron resonance) ion sources, in which microwaves are injected into the ion source volume at a frequency corresponding to the electron cyclotron resonance frequency defined by the magnetic field applied to a region inside the volume, the ion current does not instantaneously drop to zero when the RF power is removed, consequently the neutron yield of a neutron generator relying on such an ion source does not instantaneously drop to zero, which is the desired condition.

What is clearly needed is an ion source that may provide ions to accelerate to a target to produce energetic neutrons, that may be controlled to quench the ion yield instantaneously to zero, which it is known would also quench production of neutrons from the target instantaneously to zero. The same source may also be returned to full ion yield, also instantaneously.

BRIEF SUMMARY OF THE INVENTION

In an embodiment of the invention an ion source is provided, comprising a vacuum enclosure in a shape of a hollow cylinder having an axis, with a first and a second closed end, an electrical conducting RF feedthrough penetrating through the first closed end in a direction of the axis, a plurality of annular permanent magnets coaxial with and surrounding the vacuum enclosure, spaced evenly in a direction of the axis of the vacuum enclosure, an antenna within the vacuum enclosure, connected to the RF feedthrough, an iris exit opening through the second closed end, coaxial with the vacuum enclosure, an RF power source coupled through a first remotely operable switching mechanism to the RF feedthrough outside the vacuum enclosure, a DC electric power supply coupled through a second remotely operable switching mechanism to the RF feedthrough outside the vacuum enclosure, and control circuitry adapted to operate the first and the second remotely operable switching mechanisms alternately, powering the antenna by the RF power source and by the DC electric power source.

In one embodiment the control circuitry comprises a single actuator signal operating both the first and the second remotely operable switching mechanisms such that as one is opened the other is closed simultaneously. Also, in one embodiment the antenna is an element elongated in the direction of the axis and having a circular cross section concentric with the cylinder of the vacuum enclosure. In one embodiment the ion source further comprises an RF capacitor rather than a remotely operable switch in a line from the RF source to the RF feedthrough. And in one embodiment the remotely operable switching mechanisms are solid-state circuitry.

In one embodiment an ion source is provided, comprising a vacuum enclosure in a shape of a hollow cylinder with a first and a second closed end, an RF feedthrough through the first closed end, an electrical feedthrough through the first closed end, a plurality of annular permanent magnets coaxial with and surrounding the vacuum enclosure, spaced evenly in a direction of an axis of the vacuum enclosure, a first antenna within the vacuum enclosure, connected to the RF feedthrough, a second antenna within the vacuum enclosure connected to the electrical feedthrough, an iris exit opening through the second closed end, coaxial with the vacuum enclosure, an RF power source coupled through a first remotely operable switching mechanism to the RF feedthrough outside the vacuum enclosure, a DC electric power supply coupled through a second remotely operable switching mechanism to the electrical feedthrough outside the vacuum enclosure, and control circuitry adapted to operate the first and the second remotely operable switching mechanisms to alternately power the first antenna by the RF power source and the second antenna by the DC electric power source.

In one embodiment the control circuitry comprises a single actuator signal operating both the first and the second remotely operable switching mechanisms such that as one is opened the other is closed simultaneously. Also, in one embodiment the antenna is an element elongated in the direction of the axis and having a circular cross section concentric with the cylinder of the vacuum enclosure. Also, in one embodiment the second antenna is a ring concentric with the vacuum enclosure, and in one embodiment the remotely operable switching mechanisms are solid-state circuitry.

In one embodiment an ion source is provided, comprising a vacuum enclosure in a shape of a hollow cylinder with a first and a second closed end, a plurality of annular permanent magnets coaxial with and surrounding the vacuum enclosure, spaced evenly in a direction of an axis of the vacuum enclosure, an induction coil having a plurality of turns around an outside of the cylindrical vacuum enclosure, an electrical feedthrough through the first closed end, an antenna within the vacuum enclosure connected to the electrical feedthrough, an iris exit opening through the second closed end, coaxial with the vacuum enclosure, an induction voltage source coupled to the induction coil through a first remotely operable switch, a DC electric power supply coupled through a second remotely operable switching mechanism to the electrical feedthrough through the first closed end, and control circuitry adapted to operate the first and the second remotely operable switching mechanisms to alternately power the induction coil and the antenna.

In one embodiment the control circuitry comprises a single actuator signal operating both the first and the second remotely operable switching mechanisms such that as one is opened the other is closed simultaneously. Also, in one embodiment the antenna is a flat disk with a plane oriented parallel to the closed ends and concentric with the vacuum enclosure. Also, in one embodiment the remotely operable switching mechanisms are solid-state circuitry.

In one embodiment of the invention an ion source is provided, comprising a vacuum enclosure in a shape of a hollow cylinder having an axis, with a first and a second closed end, a ceramic RF window through the first closed end, concentric with the axis, an electrical feedthrough penetrating through the first closed end in a direction of and off center from the axis, a plurality of annular permanent magnets coaxial with and surrounding the vacuum enclosure, spaced evenly in a direction of the axis of the vacuum enclosure, an antenna within the vacuum enclosure, connected to the electrical feedthrough, an iris exit opening through the second closed end, coaxial with the vacuum enclosure, an RF power source coupled through a first remotely operable switching mechanism to a waveguide proximate the ceramic window, a DC electric power supply coupled through a second remotely operable switching mechanism to the electrical feedthrough outside the vacuum enclosure, and control circuitry adapted to alternately power the waveguide by the RF power source and the antenna by the DC electric power source.

In one embodiment the control circuitry comprises a single actuator signal operating both the first and the second remotely operable switching mechanisms such that as one is opened the other is closed simultaneously. Also, in one embodiment the antenna is a ring element concentric with the cylinder of the vacuum enclosure. In one embodiment the ion source further comprises an RF capacitor rather than a remotely operable switch in a line from the RF source to the waveguide. And in one embodiment remotely operable switching mechanisms are solid-state circuitry.

DETAILED DESCRIPTION OF THE INVENTION

Figure 1:
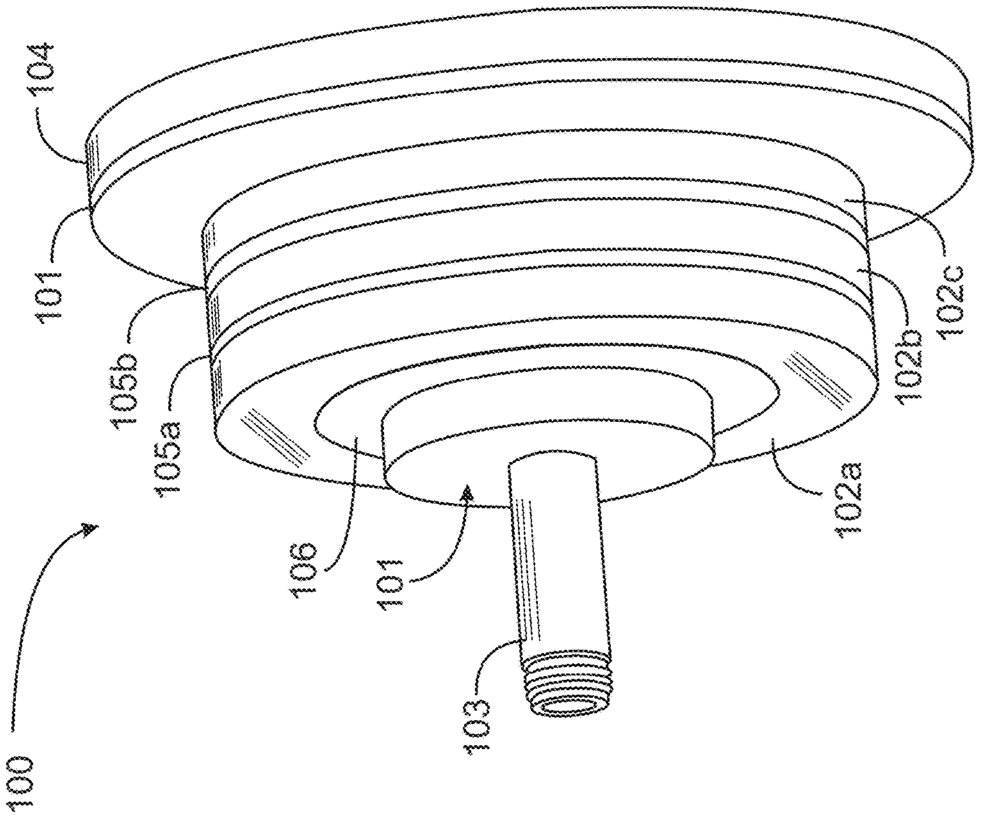
Fig. 1 (Prior Art)
FIG. 1 is an external perspective view of an ECR ion source in the prior art.

FIG. 1 is an external perspective view of an ECR ion source 100 in the prior art. This ion source comprises a vacuum enclosure 101, a flange 104 which may be utilized for joining the ion source to a neutron generator or any other device or system for which ions are needed, a plurality of annular permanent magnet disks 102*a*, 102*b* and 102*c*, which provide a magnetic field in the vacuum enclosure to enhance a plasma for producing ions, and, in this example an N-type RF feedthrough 103 for coupling to an RF power supply. The illustration of three permanent magnetics is exemplary, and in other embodiments more or fewer magnets may be employed. Material of the vacuum enclosure is not magnetically permeable as a condition of enabling the magnetic field to form inside the volume of the vacuum enclosure. Stainless steel is one example of a suitable material for the vacuum enclosure.

In this example the cylindrical permanent magnets are shown concentric with an axis of a cylindrical portion of the vacuum enclosure and evenly spaced along the direction of the axis. In practice there are a variety of ways the structure may be accomplished. In one embodiment polymer spacers may be employed to position and orient the cylindrical magnets. Two polymer spacers 105*a* and 105*b* in this embodiment space the three permanent magnets 102*a*, 102*b* and 102*c*, and one hollow polymer cylinder 106 spaces the magnets from the vacuum enclosure. It should be understood that in this embodiment flange region 101 adjacent flange 104 is an integral part of vacuum enclosure 101.

Figure 2:
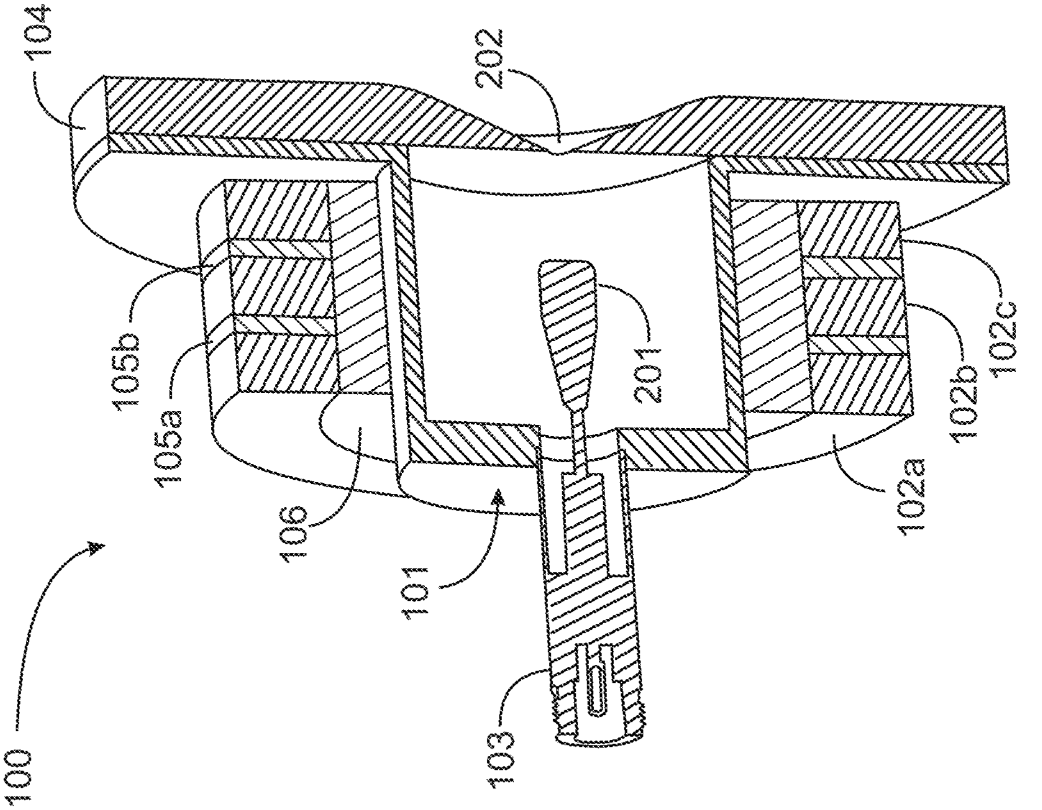
Fig. 2 (Prior Art)
FIG. 2 is a sectioned view of the ECR ion source of FIG. 1 in the prior art.

FIG. 2 is a sectioned view of the ECR ion source of FIG. 1. Permanent magnets 102*a*, 102*b* and 102*c* are shown surrounding spacer hollow cylinder 106, separated by spacers 105*a* and 105*b*. An RF antenna 201 in this example, coupled to RF input 103, is shown in the internal volume of vacuum enclosure 101. Vacuum enclosure 101 has an iris opening 202 providing a passage for ions out of vacuum enclosure 101 and into a volume of a system or device for which ions are produced, such as, in this example, a neutron source. Deuterium gas molecules may be introduced to vacuum enclosure 101 through a tube opening from a gas source or may enter through iris 202 from a vacuum pumped volume of a neutron source or other system to which the ion source may be physically coupled.

Figure 3:
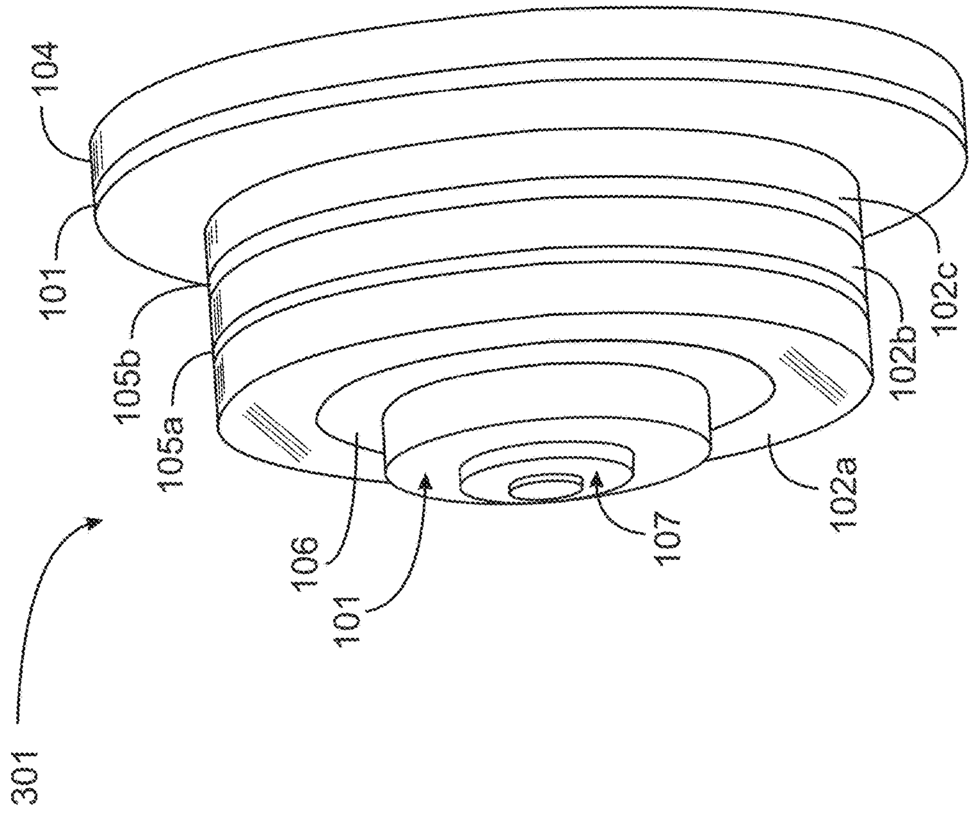
Fig. 3 (Prior Art)
FIG. 3 is an external perspective view of an ECR ion source in the prior art with a microwave window rather than an RF feedthrough.

FIG. 3 is an external perspective view of an ECR ion source 301 in the prior art with a microwave window 107 rather than an RF feedthrough. Elements that are the same as in the embodiment of FIG. 1 are annotated with the same element numbers as in FIG. 1. Ion source 301 has a ceramic window 107 through which RF radiation enters the ion source's plasma chamber. The ceramic window is hermetically sealed to the vacuum enclosure.

Figure 4:
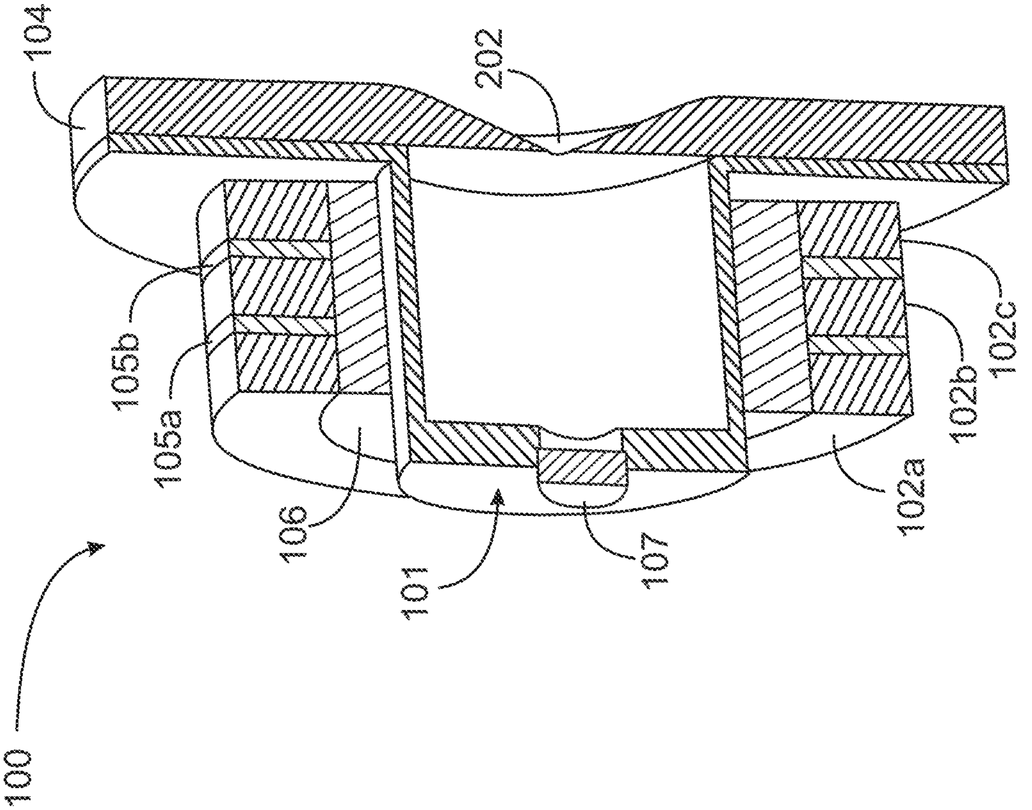
Fig. 4 (Prior Art)
FIG. 4 is a perspective sectioned view of the ECR ion source of FIG. 3 in an embodiment of the invention.
Figure 5:
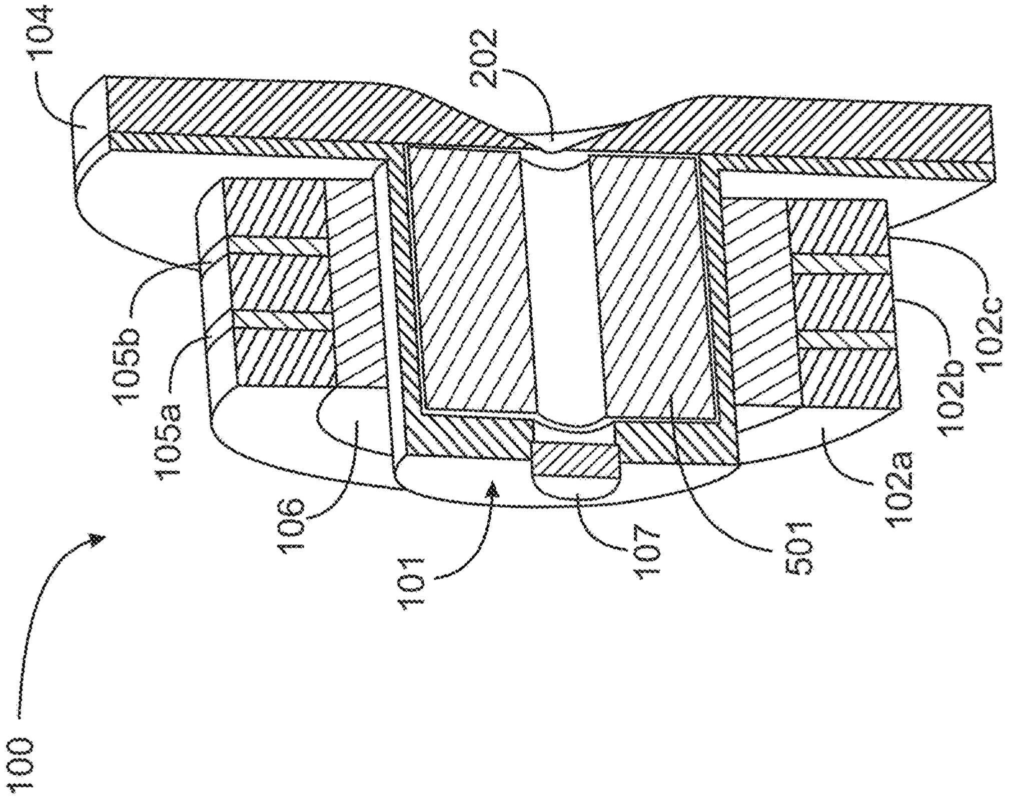
Fig. 5 (Prior Art)
FIG. 5 is a sectioned perspective view of the ECR ion source of FIG. 3 with a metal filler hollow cylinder inserted to reduce volume.

FIG. 5 is a perspective sectioned view of the ECR window ion source of FIG. 4 with a hollow metal cylinder 501 inserted in the internal volume of the plasma chamber to reduce the volume of the chamber to improve the pulse characteristics. Elements that are the same as in the embodiment of FIG. 1 are annotated with the same element numbers as in FIG. 1.

Figure 6B:
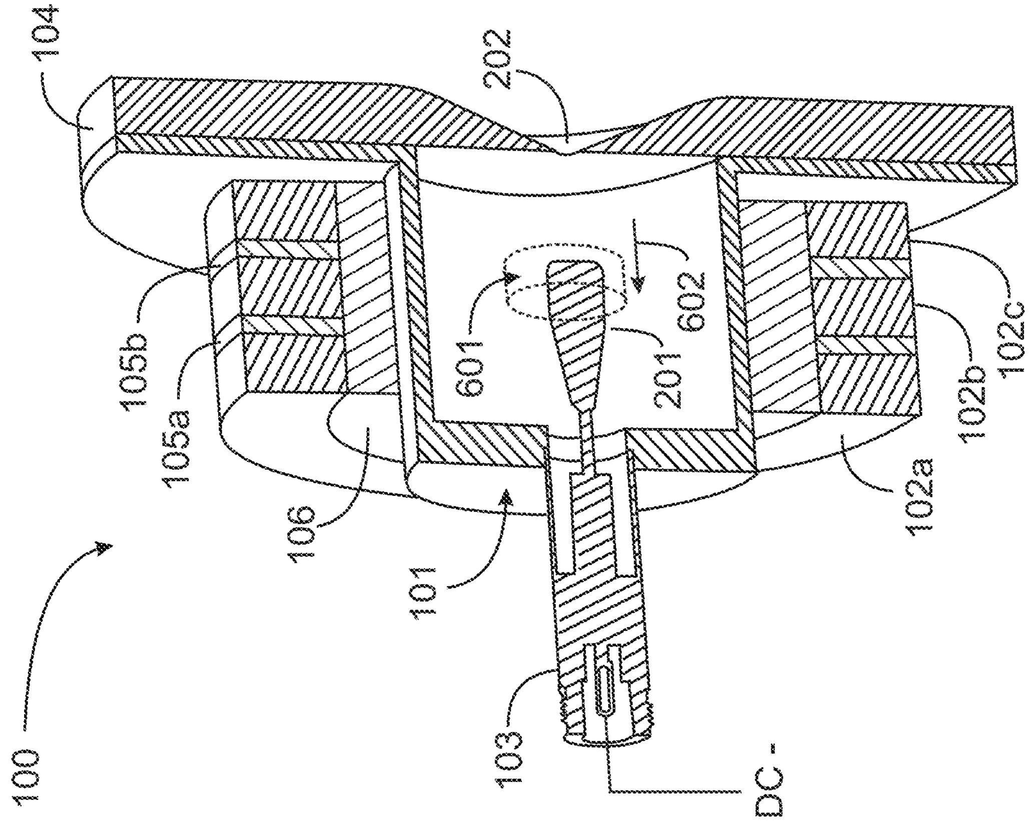
FIG. 6B illustrates the ECR ion source of FIG. 6A showing a plasma volume and position under influence of a Negative DC voltage applied to the antenna.
Figure 6A:
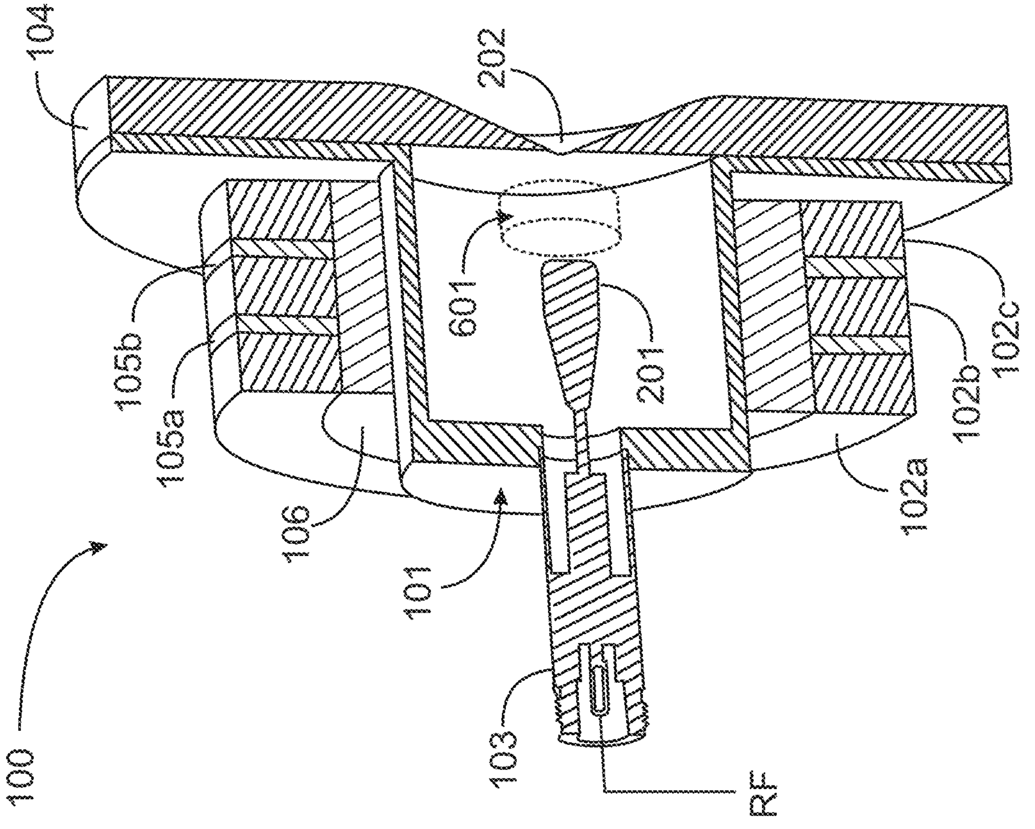
FIG. 6A illustrates an ECR ion source with an RF feedthrough and an internal antenna, showing a plasma volume and position.

FIG. 6A is a perspective sectioned view of the ion source of FIG. 2 with an RF power supply providing RF power to antenna 201 forming a plasma of positively charged hydrogen ions whose region and position is approximately represented by dotted outline 601. The inventor has determined that an efficient way to instantaneously quench the flow of ions through iris 202 is the remove RF power from antenna 201 and to subsequently apply a negative DC voltage to antenna 201 instead.

FIG. 6B illustrates ion source 100 with the RF power removed from the antenna and a negative DC voltage applied to the antenna. Plasma region 601 is seen to be moved away from iris 202 in a direction away from iris 202, quenching the passage of ions through the iris. The inventor has discovered that the RF and the DC voltage may be rapidly switched providing a pulsed production of ions through iris 202, and during the period of negative voltage on the antenna there is zero flow of ions through the iris.

RF frequency to efficiently produce ions may vary depending on a number of factors, such as the gas utilized, vacuum pressure, volume of the vacuum enclosure and other variables. The inventor has determined that a smaller volume vacuum enclosure has an effect of speeding up the initial fall off of ion production but does not eliminate a tailing effect that does not immediately reduce to zero. This is why in some embodiments a filler cylinder 501 as shown in FIG. 5 may be used, reducing the internal volume of the vacuum enclosure. In one embodiment the vacuum enclosure volume is reduced to about 33 cubic centimeters.

In the implementation shown, magnets 102A, 102B and 102C surrounding the vacuum enclosure produce a magnetic field of 875 Gauss in the enclosure, which is a required field for Electron Cyclotron Resonance (ECR) operation using a 2.45 GHz RF frequency. These ion sources can operate without an applied magnetic field but under that circumstance yield a lower current. The shape of the electrode containing the iris typically has angles set to the Pierce angle (22.5 degrees, $\pi/8$ radians) to maximize ion current extracted from the ion source.

The skilled artisan will understand that in a source producing negative ions the voltage provided to the antenna would be a positive voltage rather than negative. In another option for a source producing negative positive ions a positive quenching voltage could alternatively be applied to the antenna to drive ions into the ion chamber walls. This logic would be reversed for an ion source that instead produces negative ions.

Figure 7A:
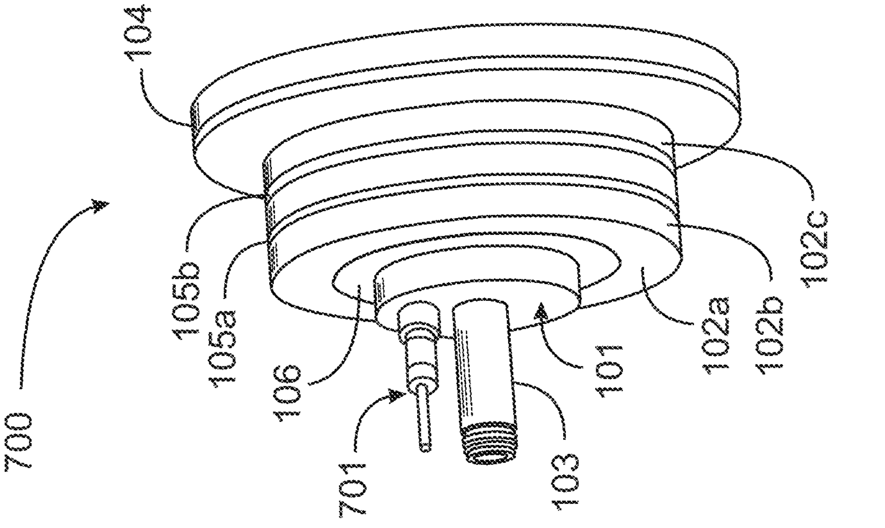
FIG. 7A illustrates an ECR plasma ion source 700 in another embodiment of the invention.

FIG. 7A illustrates an ECR plasma ion source 700 in another embodiment of the invention wherein a negative DC voltage may be applied within the vacuum enclosure of the ion source differently than described above with reference to FIGS. 6A and 6B. In plasma ion source 700 shown in FIG. 7A there is an RF feedthrough as in source 100 in FIG. 1, and also an electrical feedthrough 701.

Figure 7B:
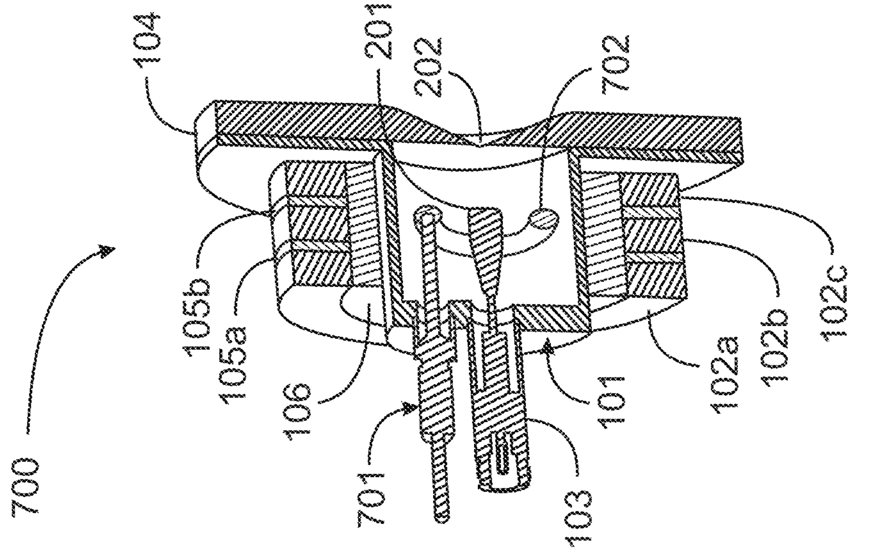
FIG. 7B is a cross section of the ECR plasma source of FIG. 7A in an embodiment of the invention.

FIG. 7B is a section view of ion source 700 showing internal elements. Electrical feedthrough 701 is seen in FIG. 7B to connect to a ring 702 that in this example is coaxial with cylindrical body 101 of the vacuum enclosure. In practice the RF feedthrough and the electrical feedthrough are coupled to an RF source and a DC source through switching circuitry not shown in FIG. 7B but described in enabling detail later in the specification with reference to other figures. The switching circuitry switches RF power and DC voltage alternately to antenna 201 and to ring 702 providing a pulsing effect for ions through iris 202 with an immediate quench.

Figure 7C:
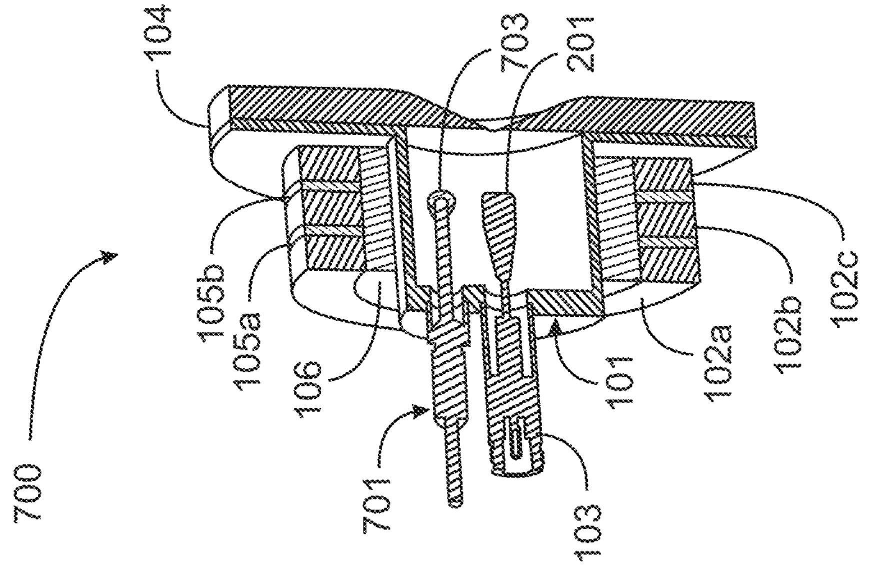
FIG. 7C is a cross section of the ECR plasma source of FIG. 7A in an alternative embodiment of the invention.

FIG. 7C illustrates the ion source of FIG. 7B with a ball 703 at the end of electrical feedthrough 701 rather than ring 702 as shown in FIG. 7B. Operation will essentially be the same as with ring 702.

Figure 8B:
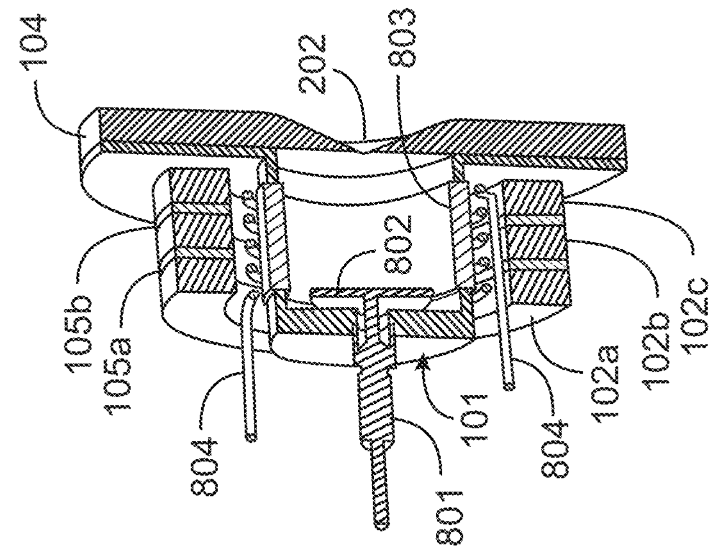
FIG. 8B is a section view of the ion source of FIG. 8A.
Figure 8A:
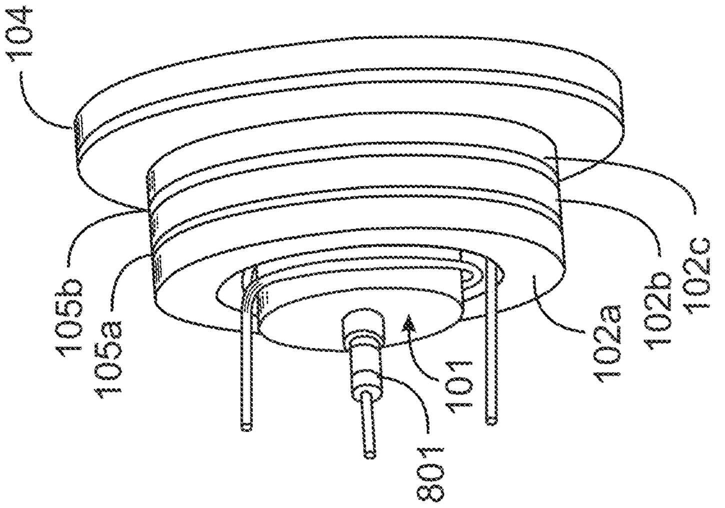
FIG. 8A is a perspective view of an ion source with an induction coil for sustaining a plasma.

FIG. 8A is a perspective view of an ion source 800 with an induction coil 804 for sustaining a plasma to produce energetic ions. FIG. 8B is a section view of the ion source of FIG. 8A. Vacuum enclosure 805 has a ceramic cylindrical portion 803 transparent to microwave energy and coil 804 passes several turns (in this example five turns) around the ceramic portion 803 and is coupled the RF power source. The RF energy supports a plasma in the volume of vacuum enclosure 101. A disc electrode 802 in an end of the vacuum enclosure is coupled to a DC electrical power supply through electrical feedthrough 801 and serves, when energized to withdraw a plasma induced in the vacuum enclosure away from the iris, much as described above with reference to FIGS. 6A and 6B.

Figure 9B:
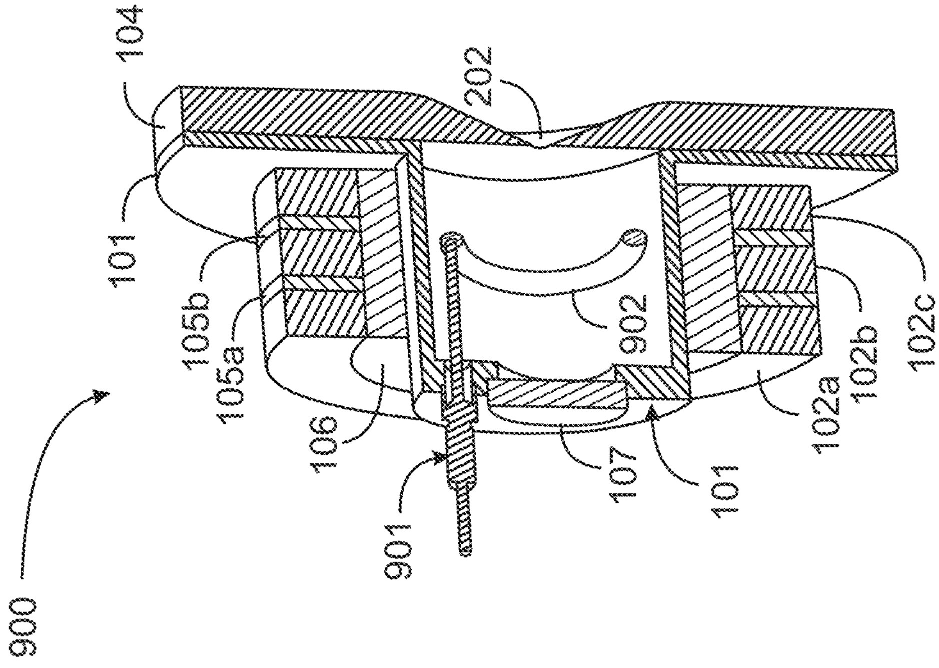
FIG. 9B is a section view of the ion source of FIG. 9A.
Figure 9A:
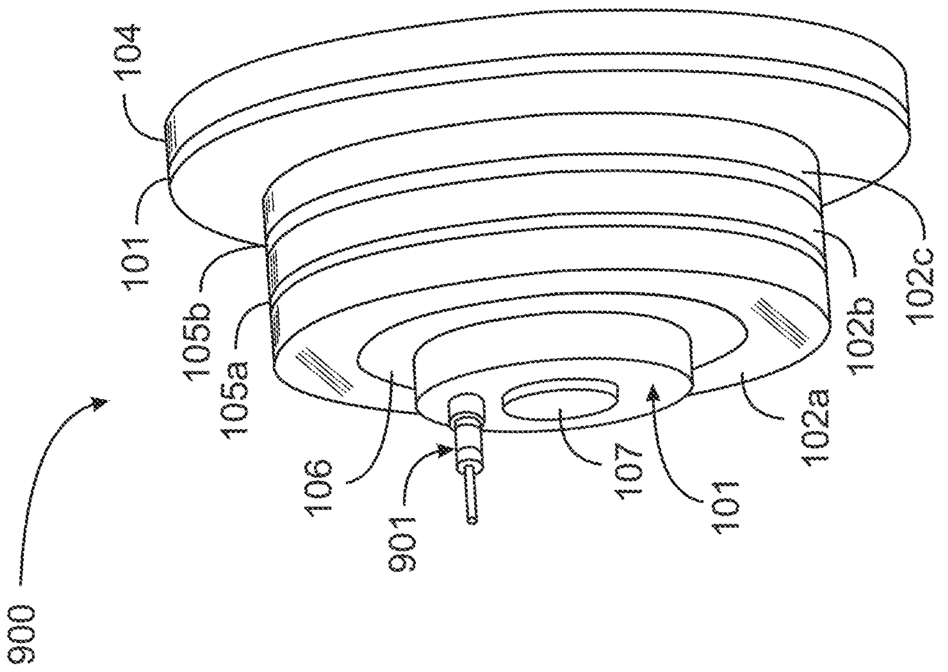
FIG. 9A is a perspective view of an ECR ion source in an embodiment of the invention.

FIG. 9A is a perspective view of an ECR ion source 900 having a ceramic window 107 concentric with vacuum enclosure 101, through which microwaves may enter the enclosure and support a plasma. In this embodiment an electrical feedthrough 901 penetrates the front closed end of the vacuum enclosure. FIG. 9B is a section view of ion source 900 showing the electrical feedthrough also sectioned and extending inside the vacuum enclosure to a metal ring 902. In operation with a plasma maintained in the vacuum enclosure by microwaves penetrating through window 107 ring 902 may be biased by a voltage imposed on electrical feedthrough 901. In a circumstance of the ion source producing positive ions, ring 902 may be biased to a negative voltage to attract the positive ions and quench ion passage through iris 202.

Figure 10A:
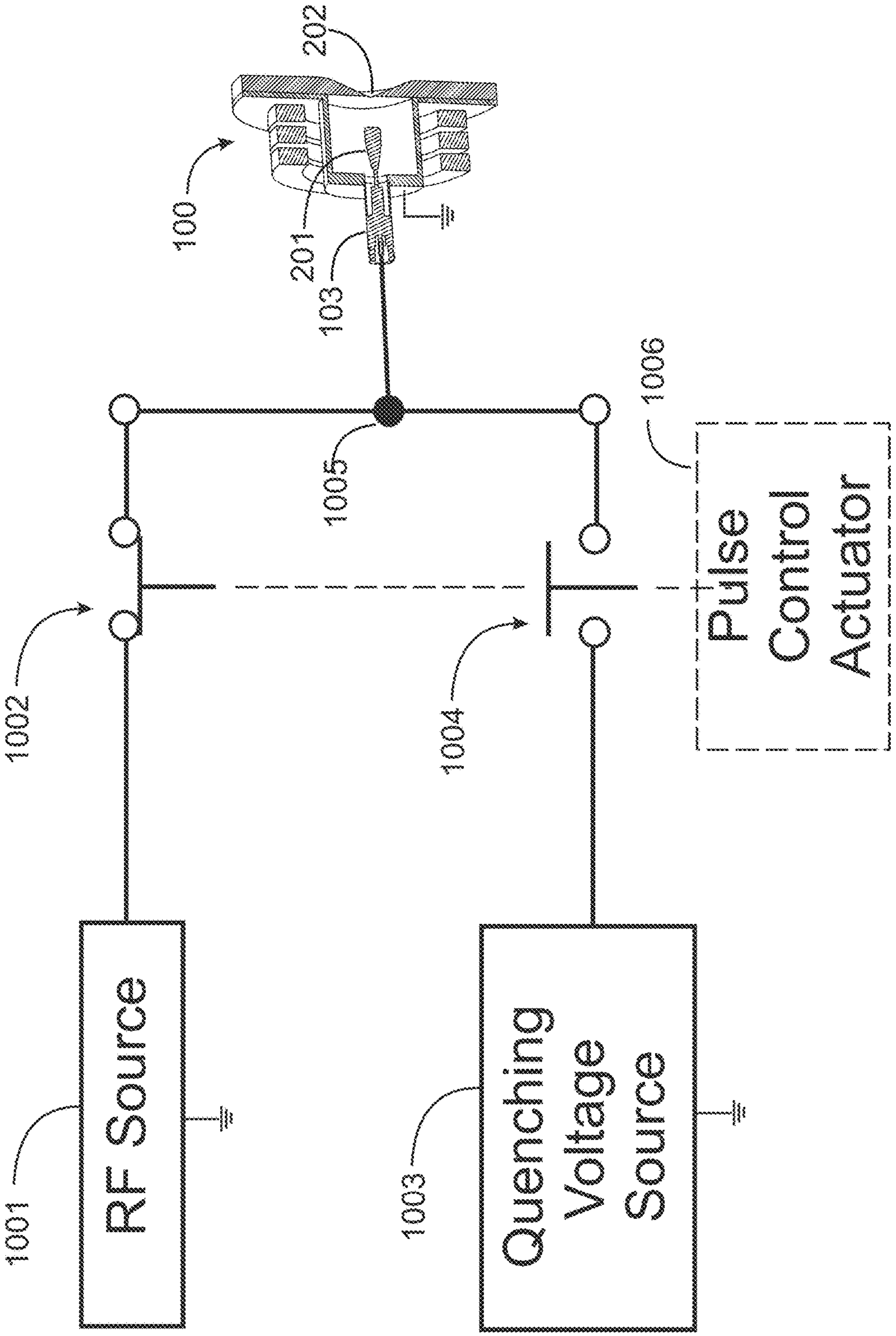
FIG. 10A is a diagrammatic view of a circuit for switching output of power supplies to an antenna of an ion source in an embodiment of the invention.

FIG. 10A is a diagrammatic view of a circuit for switching output of power supplies to an antenna of an ion source in an embodiment of the invention. Power supply 1001 is an RF source connected through a remotely operable switching mechanism 1002 to a junction point 1005. Power supply 1003 is an electrical power supply providing in this example negative DC voltage through a remotely operable switching mechanism 1004 to junction point 1005. The DC voltage would be positive or negative depending on whether the ions produced in the source are positive or negative.

Junction point 1005 is connected through feedthrough 103 to antenna 201 in an ECR ion source 100 of FIGS. 1 and 2. Switches 1002 and 1004 in this example are operated jointly by a pulse control actuator 1006 such that when switch 1002 is closed switch 1004 is open, and when switch 1002 is open switch 1004 is closed. Operating actuator at a desired frequency alternately provides RF power and negative DC voltage to antenna 201. As described above with reference to FIGS. 6A and 6B with RF power on antenna 201 a plasma is supported providing ions exiting iris 202, and with RF removed and DC negative voltage applied to antenna 201 ions remaining in the vacuum enclosure are drawn away from the iris, effectively quenching the flow of ions through the iris. The circuit of FIG. 10A is useful for pulsing ions from an ion source in circumstances wherein the RF power and DC negative voltage for quenching are alternatively applied to a common internal element, such as an antenna as shown in ion source 100 of FIG. 2.

Figure 10B:
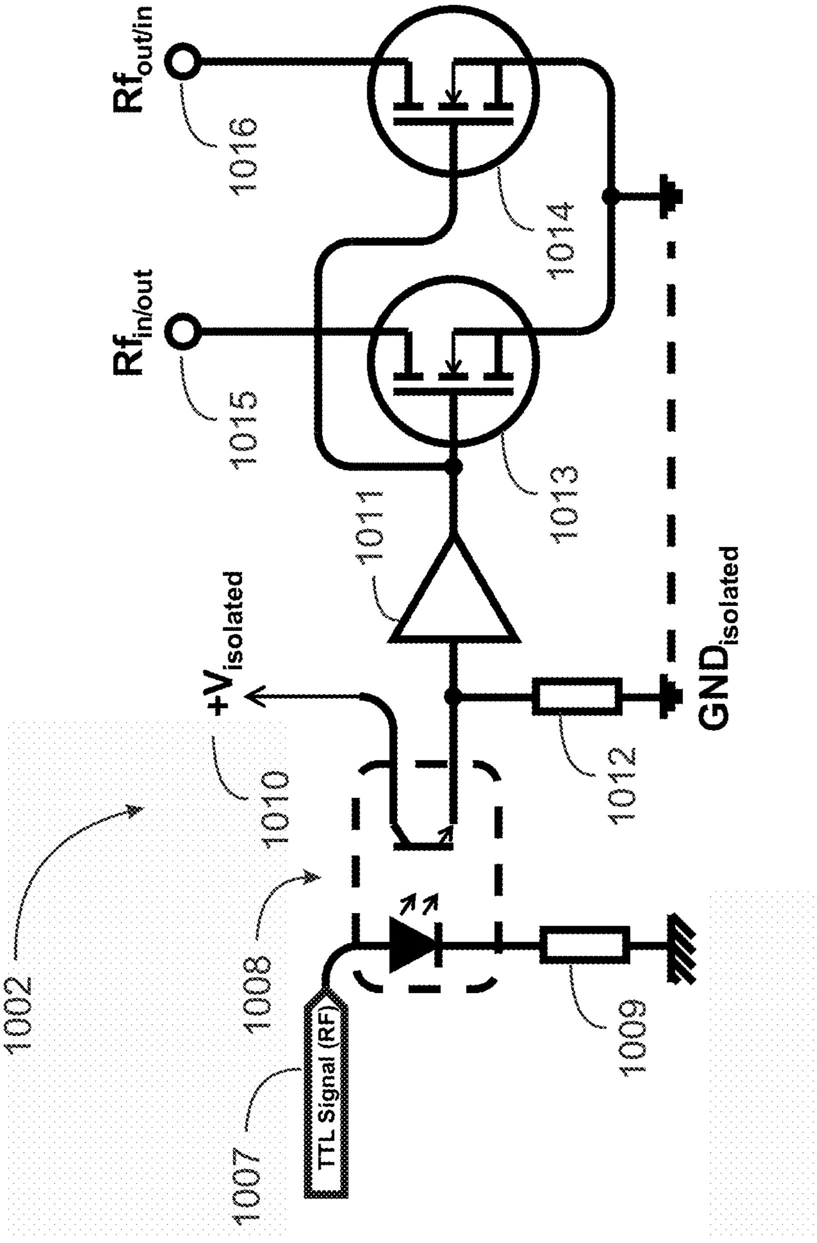
FIG. 10B illustrates an exemplary solid-state circuit that may be used as switching mechanism in an embodiment of the invention.

It is noted here that the switching mechanisms are preferably solid-state circuitry rather than mechanical switches, because mechanical switches are known to bounce, and would not provide necessary timing precision. Accordingly, FIG. 10B illustrates an exemplary solid-state circuit that may be used as switching mechanism 1002 for switching RF to ion source 100 in FIG. 10A. In FIG. 10B a command signal 1007 from pulse control actuator 1006, which may be +5V, triggers the circuit. The signal is applied to an optoisolator 1008, which may be, for example, an ONSEMI H11G1M device. The optoisolator passes a voltage 1015 to a gate driver chip 1011, such as, for example, microchip TC4420. Resistors 1009 and 1012 are current limiting resistors. The gate driver chip drives gates 1013 and 1014 for the duration of the signal. $RF_{in}$ in comes from the RF power supply and $RF_{out}$ goes to junction point 1005. Two gates are needed because the RF signal is an alternating voltage signal.

Figure 10C:
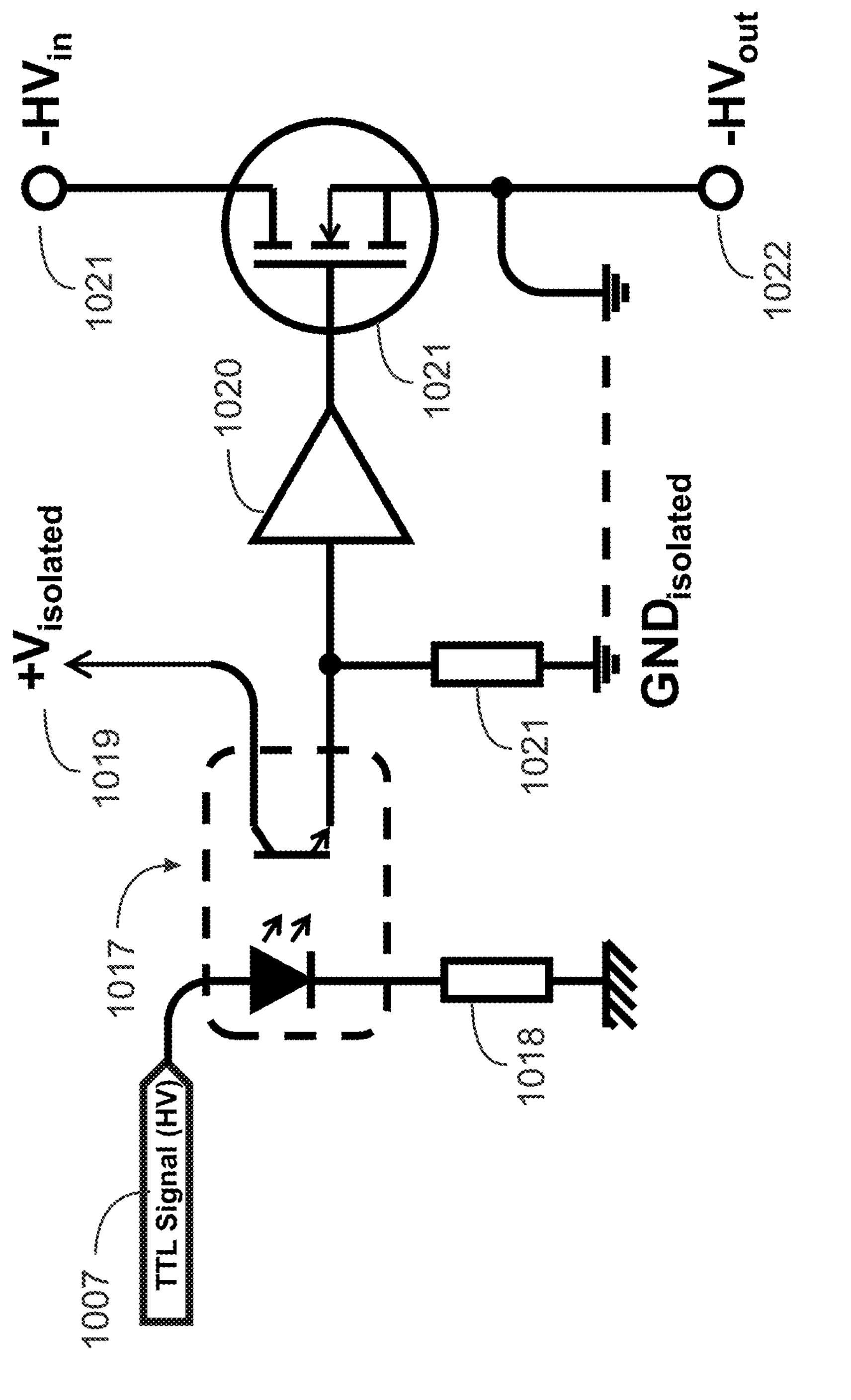
FIG. 10C is an exemplary solid-state circuit that may be used as a switching mechanism in an embodiment of the invention.

FIG. 10C is an exemplary solid-state circuit that may be used as switching mechanism 1004 for switching DC voltage from quenching voltage source 1003 to ion source 100 in 10A. This circuit is similar to that of FIG. 10B but needs only one gate because the quenching voltage is DC. In FIG. 10C the signal 1007 is the same as the signal in FIG. 10B. The signal is applied to optoisolator 1017 which switches voltage 1019 to gate driver chip 1020. Resistors 1018 and 1021 are current limiting resistors. Chip 1020 drives gate 1021, which is a high voltage N-channel MOSFET. $HV_{in}$ 1021 is voltage from quenching voltage source 1003 which is switched to $HV_{out}$ that is connected to junction point 1005.

Figure 11:
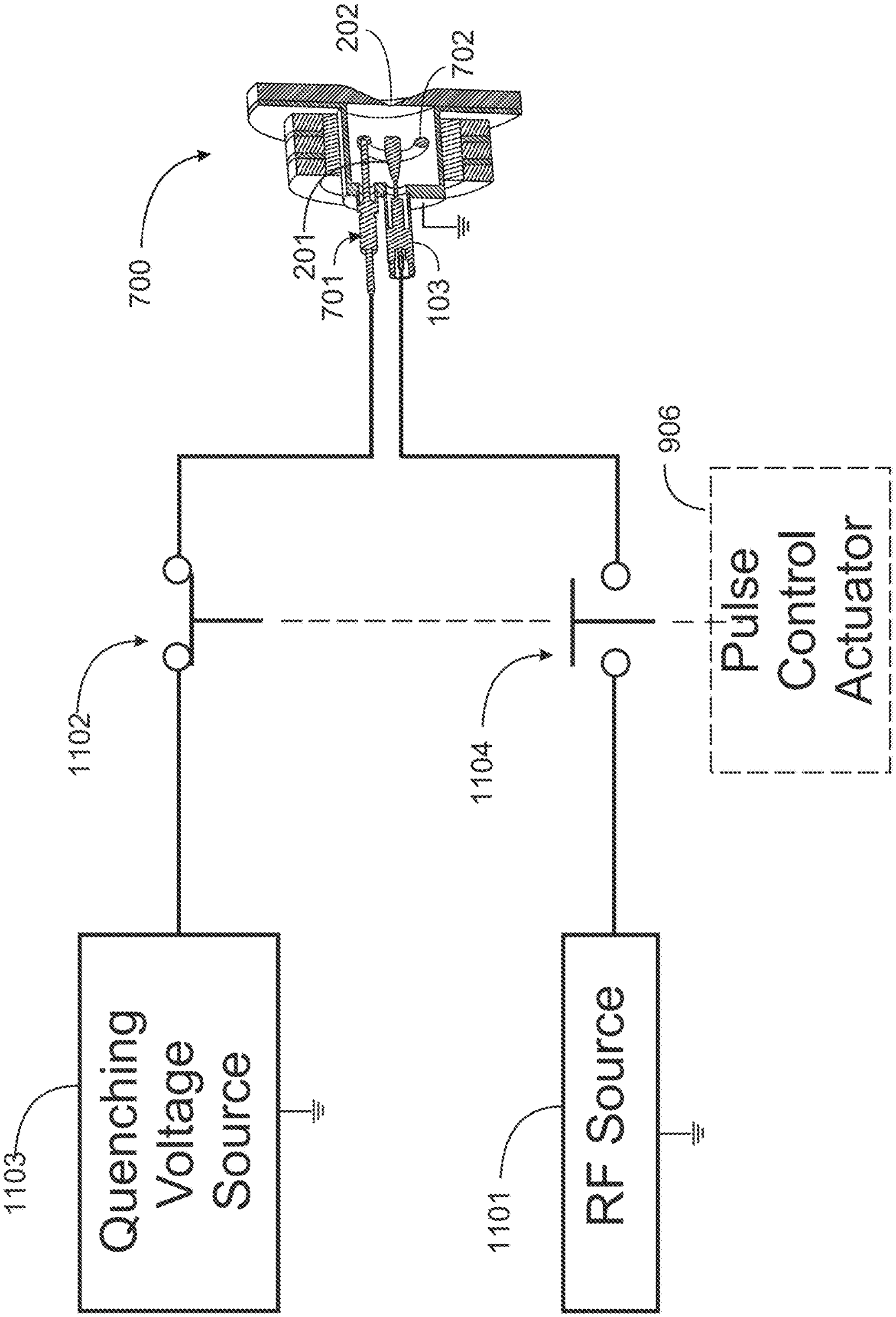
FIG. 11 illustrates a switching circuit useful for switching RF power and neg. DC quenching volage for an ion source in another embodiment of the invention.

FIG. 11 illustrates a switching circuit useful for switching RF power and negative DC quenching volage for an ion source, such as that illustrated in and described with reference to FIGS. 7A, 7B and 7C, or that of FIGS. 8A and 8B, wherein RF power is applied to one internal element and neg. DC voltage to quench is applied to a different internal element. FIG. 11 illustrates a circuit switching RF and DC to an ion source 700 such as described above referencing FIGS. 7A, 7B and 7C. Quenching voltage source 1103 is connected through switch 1102 and though electrical feedthrough 701 to internal ring 702, while RF source 1101 is connected through switch 1104 and through RF feedthrough 103 to antenna 201. Switches 1102 and 1104 are in this example operated by pulse control actuator 906 so the switches are closed alternately. Switching mechanisms 1102 and 1104 may be implemented as solid-state circuits as shown in FIGS. 10B and 10C.

Figure 12:
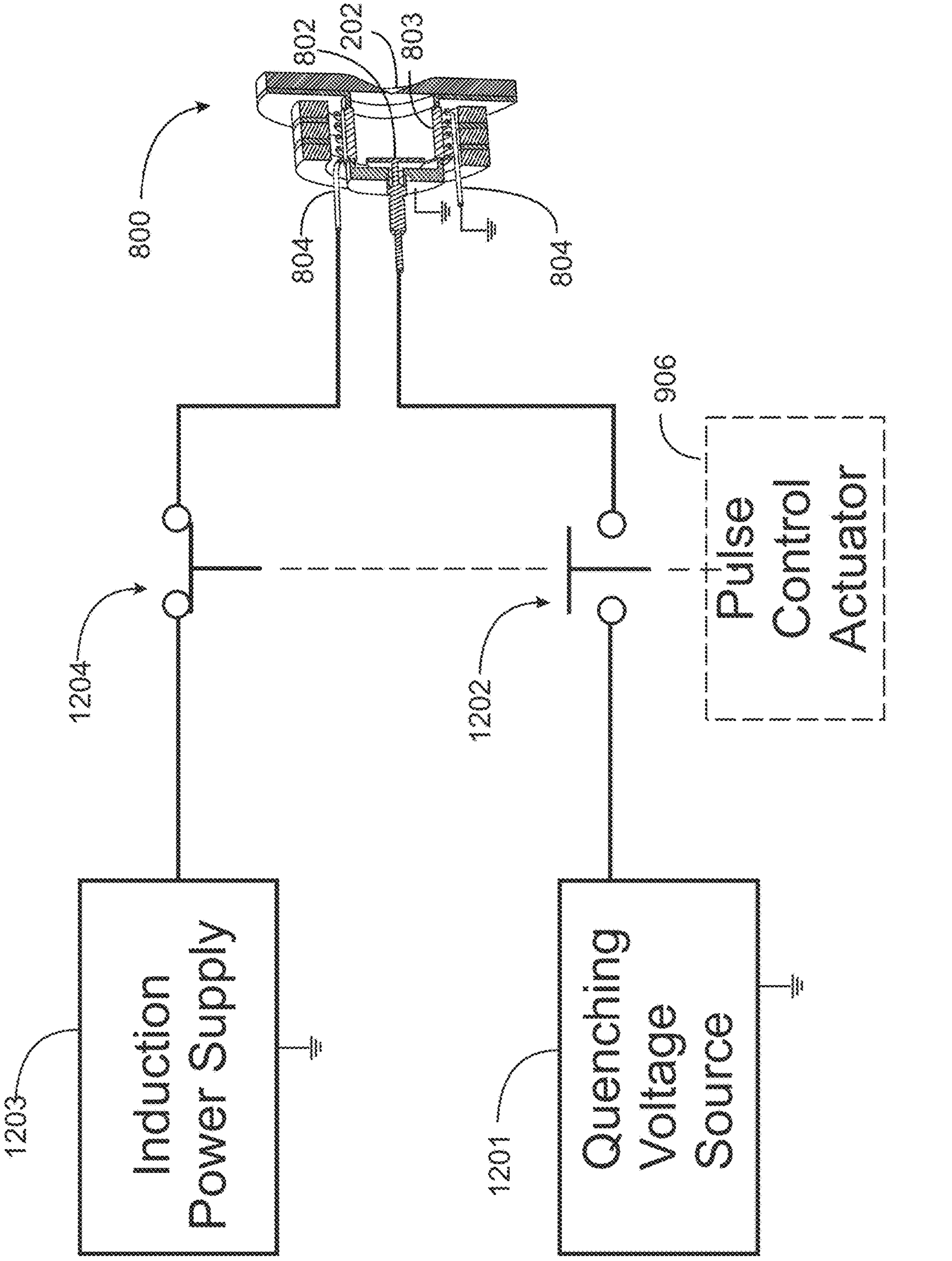
FIG. 12 illustrates a switching circuit useful for switching RF power and neg. DC quenching volage for an ion source in yet another embodiment of the invention.

FIG. 12 illustrates a switching circuit useful for operating ion source 800 of FIGS. 8A and 8B as a pulsed ion source wherein a plasma is maintained by induction. In this example an RF supply 1203 is connected through switch 1204 to induction coil 804 of ion source 800 and a quenching DC voltage source 1201 is connected through switch 1202 and through electrical feedthrough 801 to disc 802 in the vacuum enclosure. Switches 1202 and 1204 are operated jointly by a single pulse control actuator 1206 such that the two power supplies are alternately connected to their elements in the ion source. Switches 1202 and 1204 may be implemented as solid state circuits as described above with reference to FIGS. 10B and 10C.

A person skilled in the art will understand that the operation of the two switches in each of the circuit examples by a single pulse control actuator is a convenience and not a requirement. In alternative embodiments the two switches may be operated each by a dedicated actuator, and control circuitry may be provided enabling an operator to vary the timing of activation of the switches. There may be circumstances wherein some variation in timing of the two switches may be desirable, to, for example, provide control over the duty cycle of neutron emission to no-neutron-emission, and to also synchronize, for example, radiation detection equipment.

Figure 13:
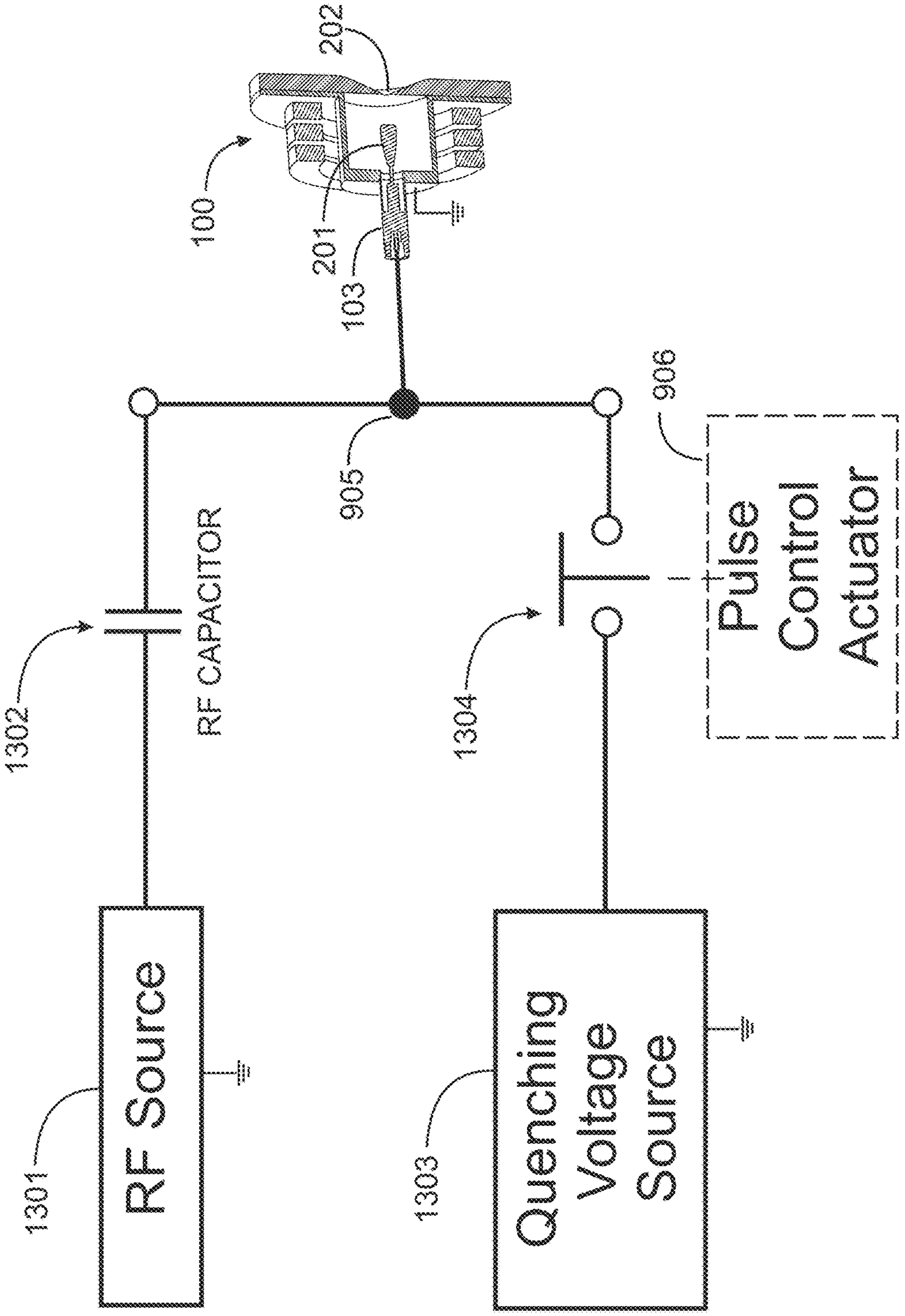
FIG. 13 illustrates a simplified approach to switching RF power and neg DC voltage to a single antenna element in a pulsed ion source.

FIG. 13 illustrates a simplified approach to switching RF power and neg DC voltage to a single antenna element in a pulsed ion source. This example relies on isolation and protection circuitry within the RF source. In this arrangement an RF capacitor 1302 is used in the RF line. Switching mechanism 1304 may be implemented as described above with reference to FIG. 10C.

Electrical switching of the antenna of an ion source from RF power to a quenching DC voltage may require care because solid state RF source circuitry typically requires 10's of volts to operate properly. The quenching voltage may be much higher, and if the power amplifier circuitry is unprotected, might damage the RF power amplifier circuitry if applied directly to that circuitry. Circuitry should therefore switch the antenna between the RF and the quenching voltage, while simultaneously isolating the RF source from the quenching voltage. Suitable High Voltage (HV) switching circuitry is straightforward using a high voltage Metal Oxide Semiconductor Field Effect Transistor (MOSFET). In the switching circuits illustrated herein the switches are meant to be representative of either physical switches that may be operated by physical actuators, or solid-state switching elements that may be operated by electrical signals.

Figure 14:
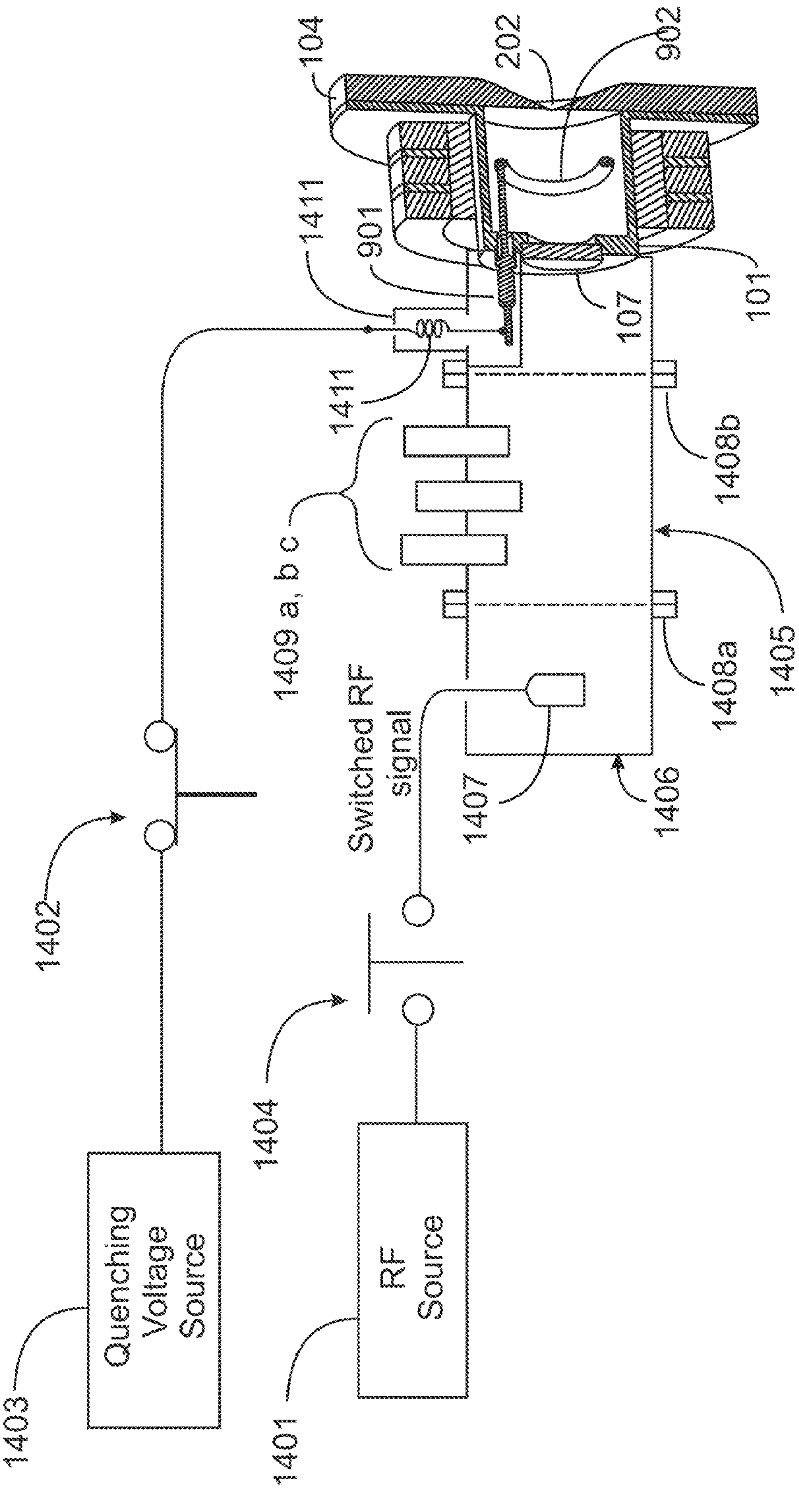
FIG. 14 illustrates a switching circuit useful for switching RF power and neg. DC quenching volage for an ion source in still another embodiment of the invention.

FIG. 14 illustrates an embodiment switching RF and DC voltage alternately to an ion source having a ceramic window 107 for passing microwaves into the vacuum enclosure of the ion source from a waveguide 1405 coupled to an RF source 1401, and a separate electrical feedthrough 901 to a ring 902 for the quenching voltage from a voltage source 1403. Waveguide 1405 is shown as an outline of a structure having flanges 1408*a* and 1408 for connecting portions of the waveguide structure. A microwave launcher 1406 has an internal antenna 1407 connected through switching mechanism 1404 to RF source 1401. Waveguide 1405 has a three-stub tuner (1409*a*, *b* and *c*) in this example for impedance matching. A small cavity enclosure 1411 to separate the electric feedthrough from the waveguide encloses an inductor coil 1411 to block microwave feedback. The coil connects on one end to the electrical feedthrough and on the other to quenching voltage source 1403 through switching mechanism 1402.

The switching mechanisms may be implemented as solid-state circuits as shown in FIGS. 10B and 10C, and pulsing signal 1007 triggers the switching mecanisms to alternate RF feed and electrical quenching voltage to the waveguide and to ring 902 in the ion source.

A person of ordinary skill in the art will understand that the embodiments illustrated in this application and described in the instant specification are entirely exemplary and are not limiting to the scope of the invention, which is limited only by the claims that follow.

The invention claimed is:

1. An ion source, comprising:
- a vacuum enclosure in a shape of a hollow cylinder having an axis, with a first and a second closed end;
- an electrical conducting RF feedthrough penetrating through the first closed end in a direction of the axis;
- a plurality of annular permanent magnets coaxial with and surrounding the vacuum enclosure, spaced evenly in a direction of the axis of the vacuum enclosure;
- an antenna within the vacuum enclosure, connected to the RF feedthrough;
- an iris exit opening through the second closed end, coaxial with the vacuum enclosure;
- an RF power source coupled through a first remotely operable switching mechanism to the RF feedthrough outside the vacuum enclosure;
- a DC electric power supply coupled through a second remotely operable switching mechanism to the RF feedthrough outside the vacuum enclosure; and
- control circuitry adapted to operate the first and the second remotely operable switching mechanisms alternately, powering the antenna by the RF power source and by the DC electric power source.

2. The ion source of claim 1 wherein the control circuitry comprises a single actuator signal operating both the first and the second remotely operable switching mechanisms such that as one is opened the other is closed simultaneously.

3. The ion source of claim 1 wherein the antenna is an element elongated in the direction of the axis and having a circular cross section concentric with the cylinder of the vacuum enclosure.

4. The ion source of claim 1 further comprising an RF capacitor rather than a remotely operable switch in a line from the RF source to the RF feedthrough.

5. The ion source of claim 1 wherein the remotely operable switching mechanisms are solid-state circuitry.

6. An ion source, comprising:
- a vacuum enclosure in a shape of a hollow cylinder with a first and a second closed end;
- an RF feedthrough through the first closed end;
- an electrical feedthrough through the first closed end:
- a plurality of annular permanent magnets coaxial with and surrounding the vacuum enclosure, spaced evenly in a direction of an axis of the vacuum enclosure;
- a first antenna within the vacuum enclosure, connected to the RF feedthrough;
- a second antenna within the vacuum enclosure connected to the electrical feedthrough;
- an iris exit opening through the second closed end, coaxial with the vacuum enclosure;
- an RF power source coupled through a first remotely operable switching mechanism to the RF feedthrough outside the vacuum enclosure;
- a DC electric power supply coupled through a second remotely operable switching mechanism to the electrical feedthrough outside the vacuum enclosure; and
- control circuitry adapted to operate the first and the second remotely operable switching mechanisms to alternately power the first antenna by the RF power source and the second antenna by the DC electric power source.

7. The ion source of claim 5 wherein the control circuitry comprises a single actuator signal operating both the first and the second remotely operable switching mechanisms such that as one is opened the other is closed simultaneously.

8. The ion source of claim 6 wherein the antenna is an element elongated in the direction of the axis and having a circular cross section concentric with the cylinder of the vacuum enclosure.

9. The ion source of claim 6 wherein the second antenna is a ring concentric with the vacuum enclosure.

10. The ion source of claim 1 wherein the remotely operable switching mechanisms are solid-state circuitry.

11. An ion source, comprising:
- a vacuum enclosure in a shape of a hollow cylinder with a first and a second closed end;
- a plurality of annular permanent magnets coaxial with and surrounding the vacuum enclosure, spaced evenly in a direction of an axis of the vacuum enclosure;
- an induction coil having a plurality of turns around an outside of the cylindrical vacuum enclosure;
- an electrical feedthrough through the first closed end:
- an antenna within the vacuum enclosure connected to the electrical feedthrough;
- an iris exit opening through the second closed end, coaxial with the vacuum enclosure;
- an induction voltage source coupled to the induction coil through a first remotely operable switch;
- a DC electric power supply coupled through a second remotely operable switching mechanism to the electrical feedthrough through the first closed end; and
- control circuitry adapted to operate the first and the second remotely operable switching mechanisms to alternately power the induction coil and the antenna.

12. The ion source of claim 11 wherein the control circuitry comprises a single actuator signal operating both the first and the second remotely operable switching mechanisms such that as one is opened the other is closed simultaneously.

13. The ion source of claim 6 wherein the antenna is a flat disk with a plane oriented parallel to the closed ends and concentric with the vacuum enclosure.

14. The ion source of claim 1 wherein the remotely operable switching mechanisms are solid-state circuitry.

15. An ion source, comprising:
- a vacuum enclosure in a shape of a hollow cylinder having an axis, with a first and a second closed end;
- a ceramic RF window through the first closed end, concentric with the axis;
- an electrical feedthrough penetrating through the first closed end in a direction of and off center from the axis;
- a plurality of annular permanent magnets coaxial with and surrounding the vacuum enclosure, spaced evenly in a direction of the axis of the vacuum enclosure;
- an antenna within the vacuum enclosure, connected to the electrical feedthrough;
- an iris exit opening through the second closed end, coaxial with the vacuum enclosure;

an RF power source coupled through a first remotely operable switching mechanism to a waveguide proximate the ceramic window;

a DC electric power supply coupled through a second remotely operable switching mechanism to the electrical feedthrough outside the vacuum enclosure; and control circuitry adapted to alternately power the waveguide by the RF power source and the antenna by the DC electric power source.

16. The ion source of claim 15 wherein the control circuitry comprises a single actuator signal operating both the first and the second remotely operable switching mechanisms such that as one is opened the other is closed simultaneously.

17. The ion source of claim 15 wherein the antenna is a ring element concentric with the cylinder of the vacuum enclosure.

18. The ion source of claim 15 further comprising an RF capacitor rather than a remotely operable switch in a line from the RF source to the waveguide.

19. The ion source of claim 1 wherein the remotely operable switching mechanisms are solid-state circuitry.

* * * * *